United States Patent [19]

Noland

[11] 4,089,664
[45] May 16, 1978

[54] BAG HOLDER FOR SELF-CLEANING BAG FILTER

[75] Inventor: Richard D. Noland, Overland Park, Mo.

[73] Assignee: Air-O-Matics, Inc., Kansas City, Mo.

[21] Appl. No.: 662,570

[22] Filed: Mar. 1, 1976

[51] Int. Cl.² .................................................. B01D 46/02
[52] U.S. Cl. ................................ 55/341 R; 55/357;
55/374; 55/379; 55/DIG. 26
[58] Field of Search ................ 55/374, 357, 378, 379,
55/341 R, DIG. 26; 210/486, 497, 457

[56] References Cited

U.S. PATENT DOCUMENTS

| | | | |
|---|---|---|---|
| 1,847,368 | 3/1932 | Wendler | 55/379 X |
| 1,872,229 | 8/1932 | Blackmore | 210/497 X |
| 1,981,356 | 11/1934 | Hatch | 55/379 X |
| 2,044,827 | 6/1936 | Adams | 55/378 X |
| 2,335,315 | 11/1943 | Seymour | 55/379 X |
| 3,377,783 | 4/1968 | Young | 55/341 R X |
| 3,550,359 | 12/1970 | Fisher et al. | 55/379 X |
| 3,765,152 | 10/1973 | Pausch | 55/379 X |
| 3,777,458 | 12/1973 | Dence | 55/379 X |
| 3,826,066 | 7/1974 | Higgins | 55/379 |
| 3,876,402 | 4/1975 | Bundy et al. | 55/379 X |
| 3,898,067 | 8/1975 | Genton | 55/379 X |
| 3,951,627 | 4/1976 | Barr, Jr. et al. | 55/374 X |

FOREIGN PATENT DOCUMENTS

| | | | |
|---|---|---|---|
| 113,704 | 9/1941 | Australia | 55/341 R |

OTHER PUBLICATIONS

"We Clean Air", Dustex Div., Bulletin 311, American Precision Industries Inc., New York.

*Primary Examiner*—Frank W. Lutter
*Assistant Examiner*—Kathleen J. Prunner
*Attorney, Agent, or Firm*—Fishburn, Gold & Litman

[57] ABSTRACT

Disclosed is a clamping means for securing filter bags in a bag filter device. The bag filter device has a filter chamber separated from a plenum chamber by means of a partition having openings therein through which the filter bags extend from the plenum chamber into the filter chamber. Gas to be filtered is passed into the filter chamber and flows through the walls of the filter bags from the outside to the inside thereof and thence into the plenum chamber prior to being discharged from the filter device as cleaned gas. The partition has a stationary shoulder surrounding each opening on the plenum chamber side. The open end or cuff of each filter bag is clamped between the shoulder and a clamping ring so as to secure the filter bag in the partition and to effect a seal which prevents leakage of unfiltered gas into the plenum chamber from the filter chamber. The seal is maintained by the influence of gravity or by a seating or force-applying means. Each clamping ring also serves as a support for a bag supporting frame disposed in each filter bag.

5 Claims, 11 Drawing Figures

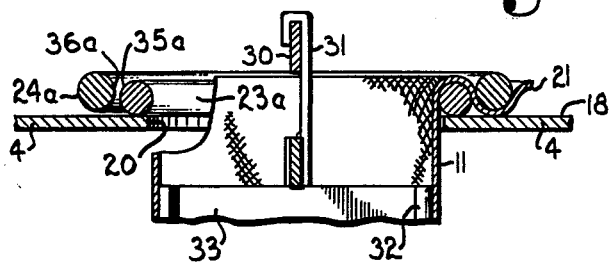
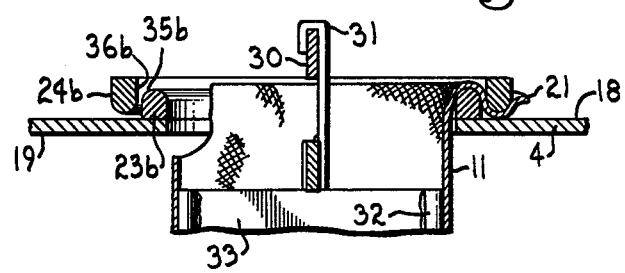
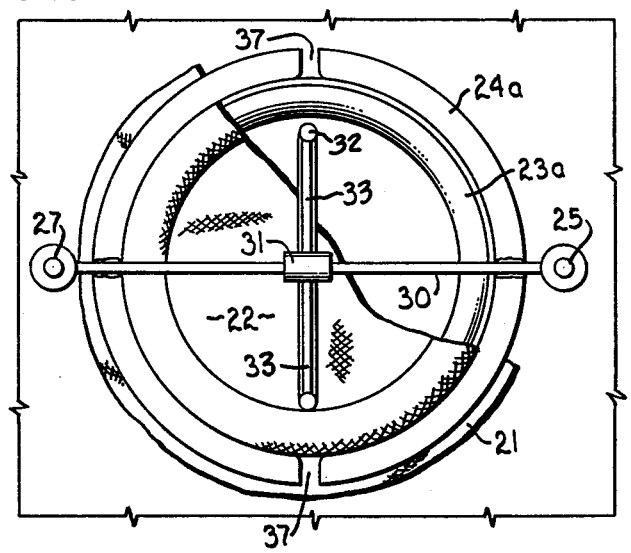

BAG HOLDER FOR SELF-CLEANING BAG FILTER

BACKGROUND OF THE INVENTION

This invention pertains to bag filter devices that are employed for separating entrained particulate solids from gases and, more particularly, pertains to means for clamping the cuffs of cloth or felt filter bags in bag filter devices of the type wherein the gas to be filtered is passed through the walls of filter bags from the outside to the inside, and wherein particulate solids which accumulate on the outside of the walls of the bags are periodically removed by back-pressuring to effect flow gas through the bag wall in a reverse direction, i.e. from the inside to the outside of the bags.

Self-cleaning bag filter devices of the type just described are disclosed in U.S. Pat. Nos. 2,072,906; 3,377,783; 3,385,033; 3,550,359, and 3,680,285. As can be seen from these patents, various means have been employed for securing the filter bags at the junction thereof with the partition between the plenum chamber and the filter chamber for the purpose of establishing and maintaining a seal whereby unfiltered gas is prevented from leaking from the filter chamber over into the plenum chamber wherein the cleaned gas is received from the bags, and whereby the established seal is also beneficial during back-pressuring of the bags to effect the removal of filtered solids therefrom. Although the bag clamping means shown in each of these patents can be utilized for securing the cuff of a filter bag to provide effective sealing, each of these means nonetheless has shortcomings with regard to construction cost and/or time and labor requirements for removing old bags and installing new ones. There was thus a continuing need for a bag clamping means for such filter bags whereby manufacture and use of such means was made simpler, easier and more economic.

One object of the present invention is, therefore, to provide a bag clamping means which overcomes the aforesaid disadvantage of prior clamping means.

Another object is to provide a bag clamping means of simple construction and low cost.

Still another object is to provide an improved bag clamping means whereby filter bags can be more easily installed and removed from bag filter devices of the type which have previously been described, while nonetheless providing an effective seal for preventing leakage of unfiltered gas from the filter chamber of the bag filter devices into the plenum chamber thereof.

Yet another object is to provide a bag clamping means having a simple and inexpensive hanger means in combination therewith for attaching a bag frame thereto.

Still another object is to provide a bag filter device of the aforesaid type that is equipped with an improved clamping means for the filter bags contained therein.

These and other objects and advantages of the present invention will become apparent from the following description and the appended claims.

SUMMARY OF THE INVENTION

The present invention is an improvement in bag clamping means used in a bag filter device having a filter chamber separated from a plenum chamber by a partition having a plenum chamber side, a filter chamber side, and at least one bag opening therein through which a filter bag extends from the plenum chamber into the filter chamber.

In accordance with the present invention, a stationary shoulder on the partition and a movable clamping ring are located on the plenum side of the partition and both the clamping ring and the shoulder of the partition extend around the opening for the filter bag. The clamping ring is normally immobile and proximate the shoulder for clamping the walls of the bag between the two, the clamping ring being held in place with fasteners and/or resting in place by the influence of gravity or friction. The ring is nonetheless selectively movable with respect to the shoulder in order to effect a separation between the two for the purpose of changing a bag when it becomes worn, torn, irreversibly blinded, or needs to be removed for installation of another type of bag made of a different material or having a different porosity.

BRIEF DESCRIPTION OF THE DRAWINGS

FIG. 9 shows use of a clamping ring which fits around the outside of the shoulder on the partition between the chambers of the bag filter device, whereas FIGS. 1-8 show use of a clamping ring which fits on top of the shoulder.

FIG. 10 is the same as FIG. 9 but shows use of a clamping ring and a shoulder having different cross-sectional configuration.

FIG. 11 is a top view of the apparatus shown in FIG. 9 and shows use of a clamping ring that is split from inside to outside for inward and outward flexing of the ring.

DESCRIPTION OF PREFERRED AND ALTERNATIVE EMBODIMENTS

Figure 1:
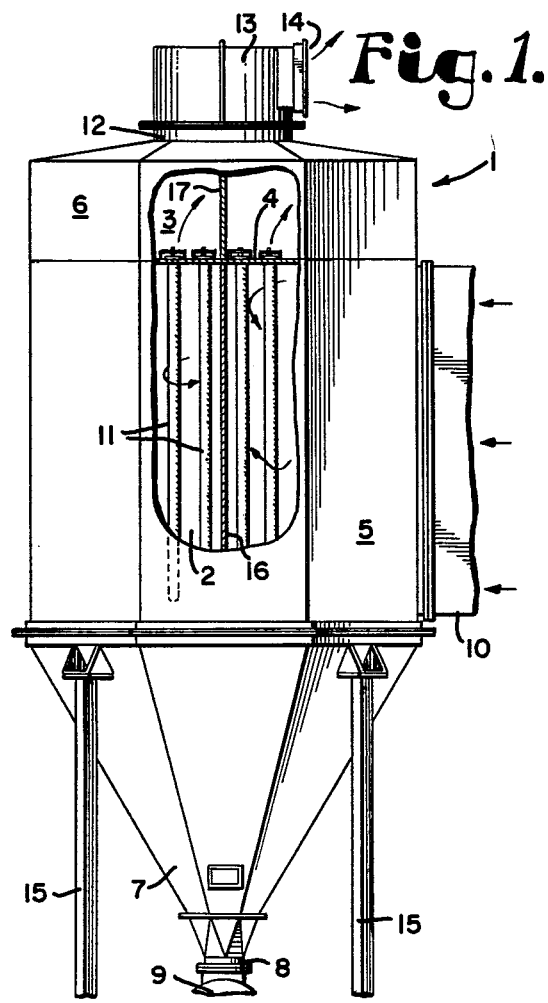
FIG. 1 is a side view, partly in section, of a bag filter device equipped with the bag clamping means of the present invention.

In FIG. 1, the bag filter device is generally depicted at 1 and comprises a filter chamber 2 and a plenum chamber 3. A partition 4 separates the two chambers, 2 and 3. The filter chamber is bounded by a metal wall 5 whereas the plenum chamber is bounded by a similar wall 6. The bottom of the filter chamber is in the form of a cone 7 which converges downwardly to an outlet 8 for discharge of solids that have been removed from the gas being cleaned by the filtration process. The outlet 8 is equipped with a rotary gas lock, represented at 9, which prevents excess leakage of unfiltered gas from the outlet. The filter chamber 2 has an inlet 10 for the gas to be cleaned, and a plurality of cloth or felt filter bags 11 are suspended from partition 4 and extend downwardly into the chamber. The plenum chamber 3 has an outlet 12 for filtered gas and a transition piece 13 whereby the filtered gas is discharged from the filter device at a right angle to the vertical axis thereof through a cleaned-gas outlet 14. The entire filter chamber 1 is supported and stabilized by means of steel legs 15. The partition is supported from below by means of one or more vertically extending plates 16, but the placement and dimensions of these support plates is such that the desired inflow and circulation of gas to be filtered is not hindered. The plenum chamber 3 is segmented by use of a plurality of vertically extending walls 17 therebetween to provide a series of cells which lead to the common central outlet 12.

During operation of the bag filter device, a gas which contains an entrained particulate solid, e.g. air which contains a dust, is continuously fed into the filter chamber 2 through inlet 10. The gas then passes through the porous walls of the bags 11, from outside to inside, and thence out of the open outer ends thereof and into plenum chamber 3. Cleaned gas, having the solids removed therefrom by deposition of the solids on the walls of the bags, is discharged from the bag filter device through outlet 14. From time to time, a cleaning gas is injected into the plenum chamber 3 for a short duration in order to raise the pressure therein to a level in excess of that which exists in the filter chamber 2. This intermittent, momentary pressurization of the plenum chamber causes the bags 11 to flex outward and also causes the gas therein to flow in a reverse direction, i.e. from inside to outside of the bags, and deposited solids on the outside of bag walls are thus dislodged and thence drop into cone 7 for removal from the bag filter device through outlet 8 and air lock 9.

Figure 4:
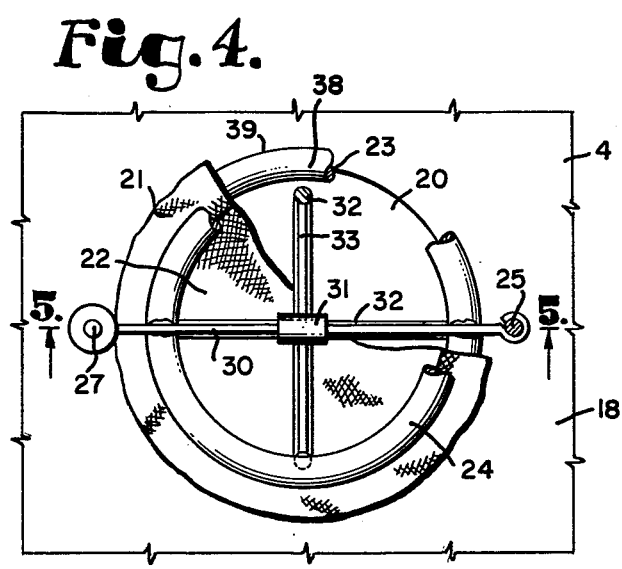
FIG. 4 is a top view, partly in section, of the apparatus shown in FIG. 3.
Figure 3:
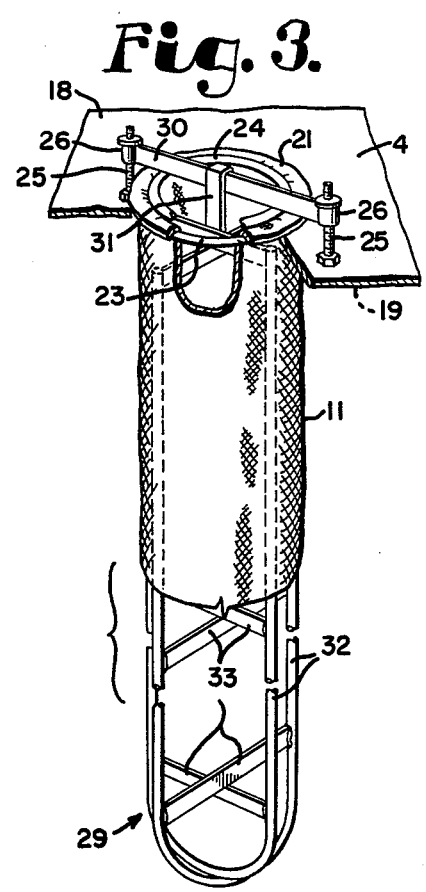
FIG. 3 is an isometric view, partly in section, of one embodiment of the present bag clamping means, and wherein the clamping means is further provided with hanger means for attaching a bag frame thereto.
Figure 5:
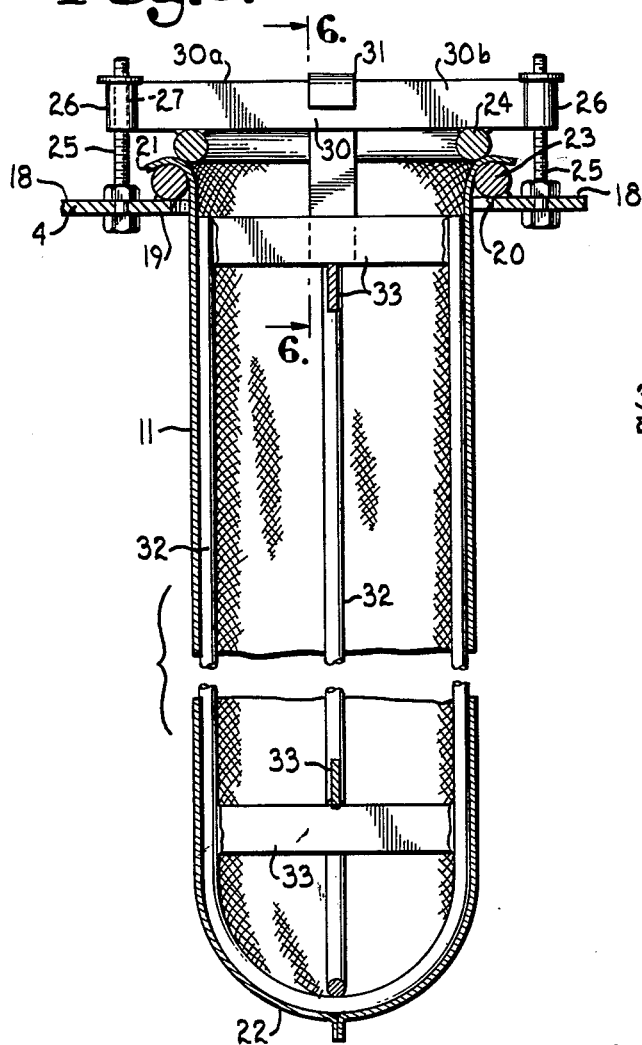
FIG. 5 is a side section view of the apparatus of FIG. 4 taken along the line 5—5 therein.
Figure 6:
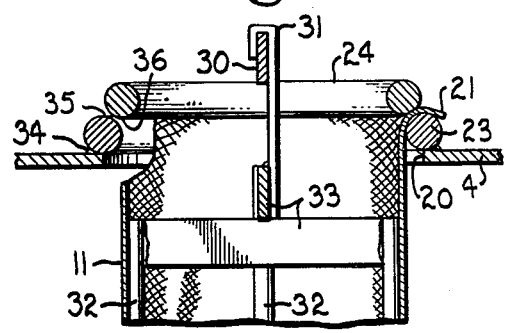
FIG. 6 is a fragmentary sectional view of the apparatus of FIG. 5 taken along the line 6—6 therein.

As was previously indicated, the present invention pertains to a bag clamp which can be used to particular advantage with bag filter devices of the reverse flow type, one version of which has been described with reference to FIGS. 1 and 2. One embodiment of the present bag clamping means is shown in FIGS. 3-8. Referring to FIGS. 4, 5 and 6, the partition 4 of the bag filter device has a plenum chamber side 18, a filter chamber side 19, and an opening 20 therein through which bag 11 extends from the plenum chamber into the filter chamber. The bag has a closed inner end 22 and a cuff 21 at the open outer end thereof. The partition 4 has a stationary shoulder 23 thereon which is located on the plenum chamber side and which extends around opening 20 for the bag. As shown in FIGS. 3-8, the shoulder is a metal ring having a circular cross-section, but the cross-section can be semi-circular, square, rectangular, etc. Where preferred, that portion of the partition adjacent the hole 20 can be shaped to provide a shoulder, e.g. the edge of the hole can be curved or beveled, but it is preferred that the shoulder project outwardly from the partition as shown in the drawing in order to provide a top 38 and a side 39 (FIG. 4) over which the outer end, or cuff, of the bag can be folded.

For use in conjunction with shoulder 23 for clamping a filter bag 11 at opening 20 to establish and maintain a seal between sides 18 and 19 of the partition by means of the bag, a movable clamping ring 24 also extends around opening 20 and is located on the plenum side 18 of the partition adjacent shoulder 23. Clamping ring 24 is normally immobile and proximate to the shoulder for clamping of the cuff 21 of the bag between the two, but the clamping ring is also selectively movable for separation thereof from the shoulder to permit changing of the bag. The clamping ring 24 can be emplaced by hand proximate the shoulder 23 for clamping of the cuff of the bag between the two and will remain in place and maintain a seal by the influence of gravity on the mass of the seal ring and any unsupported members attached thereto.

Alternatively, the seal ring can be secured in place and/or tightened down by means of a seating or force-applying means (FIGS. 5 and 8) for aligning and, if desired, pushing against the clamping ring in a direction toward the shoulder, with the seating or force-applying means being releasable for separating the ring and shoulder during the changing of bags. As shown in the drawings, the seating or force-applying means for the clamp ring comprises seating members or threaded studs 25 which are located beyond the outer perimeter of the shoulder and the clamp ring and which are stationarily anchored to partition 4. The studs 25 project axially with respect to the shoulder and the clamp ring, and seating devices or lugs 26 which project outwardly from and are connected to the clamp ring have openings 27 therein through which the studs 25 pass upwardly. When nuts 28 are tightened they bring force to bear on the lugs, with clamping ring 24 thus being urged toward shoulder 23 for firm clamping of the bag cuff 21. When the bag is to be changed, the nuts 28 are removed from studs 25 so that the clamping ring can be lifted off the shoulder and to one side of opening 20. Other force-applying means for the clamping ring can also be used, e.g. the ring can be hinged at the edge for upward and downward pivoting with respect to the shoulder, and with one lug and one stud being located opposite the hinge for forcing the clamping ring toward the shoulder. Even other types of force-applying means can be used where preferable and practical.

As shown in FIGS. 3-8, the clamping ring 24 also serves as a support for a bag frame, generally represented at 29, for maintaining bag 11 in an uncollapsed state during the filtering of gas. Accordingly, the clamping ring can be equipped with an attached hanger member 30 which extends across the central opening in the ring, and the hanger member can be adapted for attachment of the filter-bag frame thereto. More specifically, the hanger member is adapted for attachment thereto of a disengaged connector, in this example a hook 31, on the upper end of a bag frame 29 that is suspended from the hanger.

Advantageously, the hanger member 30 can be in the form of a rigid bar adapted for placement of hook 31 over the top of the bar as shown. In the drawings, the rigid-bar hanger member 30 extends all the way across the opening of the ring, but it will be understood that it can extend only part way across and still be adapted to function effectively as a hanger member. Alternatively, other hanger means can be employed for suspension of the bag frame, and means other than a hook may be employed for connecting the hanger and the frame. Whereas the illustrated bag frame has U-shaped longitudinally extending tubular members 32 for maintaining the bag in an uncollapsed state, cross-braces 33 for stabilizing the U-shaped pieces, and a hook 31 attached to an upper crossbrace of the bag frame, it will nonetheless be appreciated that other types of bag frames can be suspended from the hanger, and that a hook, when used, can be attached to other parts of the bag frame.

Preferred embodiments of the invention involve use of a bag hanger member in combination with force-applying means for the clamping ring as is illustrated in the drawings. Referring to FIG. 5, for example, it can be seen that the hanger bar 30 not only extends all the way across the opening of the attached clamping ring but also has ends 30a and 30b that extend beyond the outer periphery of the ring and which have openings 27 therein which extend axially with respect to the ring. In this case the lugs 26 are a part of the hanger member, and threaded studs 25, which are anchored to the partition 4, extend through openings 27 axially with respect to clamping ring 24, and the ring is thus urged toward shoulder 23 for clamping of the cuff 21 when nuts 28 are tightened.

Figure 7:
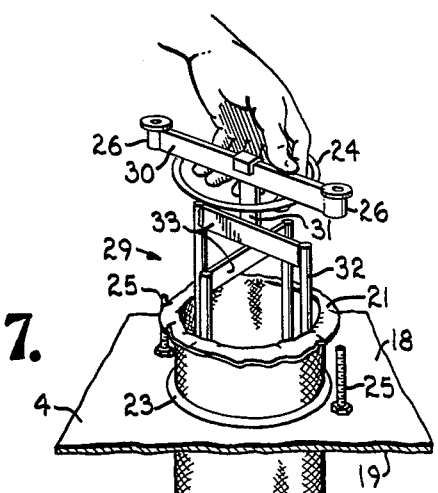
FIG. 7 is an isometric view of the apparatus of FIGS. 3-6 depicting the installation or removal of a filter bag and a bag frame in accordance with the present invention.
Figure 8:
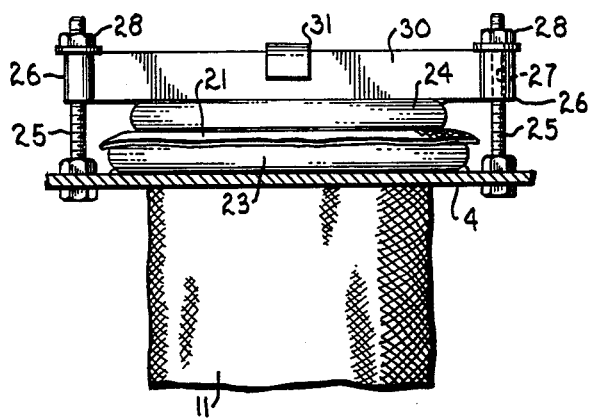
FIG. 8 is a fragmentary side view of the apparatus of FIG. 7 showing a filter bag clamped in place by means of the present clamping means.

The installation and clamping of a filter bag by means of the present apparatus can best be visualized by reference to FIG. 7. The bag 11 is first slipped over frame 29 and the cuff 21 is turned outward for engagement with shoulder 23 on partition 4. The hook 31 is then engaged, as shown, with the hanger bar 30. Clamping ring 24 is attached to the hanger bar, and the bar thus serves as a handle. The bag frame 29 with the bag thereon having a transverse dimension less than the opening 20 (see FIG. 5), is easily maneuvered into opening 20 and lowered into the filter chamber until the bag cuff abuts shoulder 23 and the clamping ring 24 comes to rest on the bag cuff. The clamping ring can then be pushed down with the force-applying means, as previously described, for secure gripping of the bag cuff. FIGS. 3, 4, 5, 6 and 8 represent the relationship of the apparatus combination after seating of the bag cuff with the shoulder 23 and the clamping ring 24. In FIGS. 5 and 6 it can be seen that leakage of unfiltered gas from the filter chamber side to the plenum chamber side of the partition is prevented by a braze 34 (FIG. 6) between the partition and ring 23, and by the wall of the bag 11. Provided ring 24 is forced down tight enough, leakage of unfiltered gas through the gap between the ring and shoulder 23 is prevented by the presence of bag cuff 21 between the two. The seal effected by means of the shoulder, clamping ring and bag cuff is also effective and hence beneficial during back pressuring of the bags.

By further reference to FIGS. 3–8 it can be seen that the shoulder 23 and the clamping ring 24 each han an uninterrupted, bag gripping face therein, represented at 35 and 36 respectively, and that these faces oppose each other, with the gripping face of the shoulder being aligned for abutment with the outer side of the bag cuff 21 whereas the gripping face on the clamping ring is aligned for abutment with the inner side of the cuff. As shown in FIGS. 3–8, the gripping face 36 of the clamping ring is on the bottom thereof while the gripping face 35 of the shoulder is on the top thereof. However, by reference to FIGS. 9 and 10, it can be seen that in other embodiments of the present invention the clamping ring 24a or 24b can be adjacent to the side of the shoulder 23a or 23b when the cuff 21 of a bag is clamped between the ring and the shoulder, this being in distinction to the clamping ring being adjacent to the top of the shoulder as shown in FIGS. 3–8. In addition, the bag gripping faces 35a and 35b on shoulders 23a and 23b, respectively, in FIGS. 9 and 10 are on the outside of the shoulder, and with gripping faces 36a and 36b on clamping rings 24a and 24b being on the inside thereof. Accordingly, when the clamping ring is adjacent to the side of the shoulder as shown in FIGS. 9 and 10, the gripping faces on the sides of these members are opposed to each other for very secure gripping of the bag cuff 21 which can be folded back over the shoulder for more effective frictional contact therewith. As shown in FIG. 11, the ring 24a (or 24b) can be split into clamping ring halves from the inside to the outside of the ring as represented at 37, to permit outward flexing thereof during emplacement of the ring around the shoulder, but whereafter the ring nonetheless exerts satisfactory inward pressure toward the shoulder and against the bag cuff.

Gripping faces 35, 35a, 36 and 36a are curved, but the faces can also be flat as in FIG. 10. In addition, flat faces can be used, where preferred, as substitutes for the curved faces shown for ring 24 and shoulder 23 in FIGS. 3–8. It will also be understood that even though the shoulder and clamping ring are shown having a circular configuration when viewed axially, the configuration of these members when thus viewed can also be square, rectangular, elliptical, etc., according to the configuration of the cross-section of the bag being used.

Figure 2:
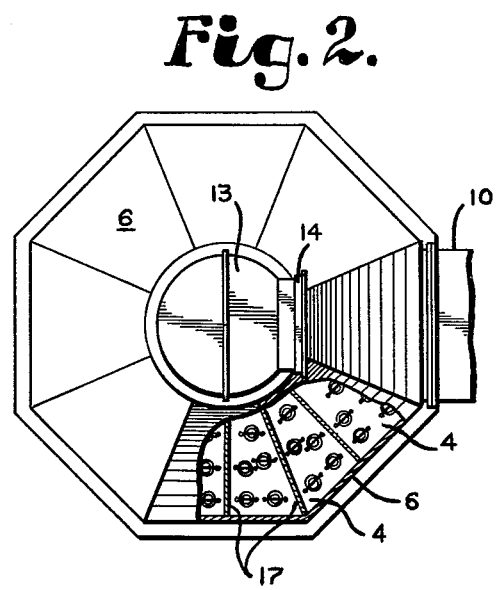
FIG. 2 is a top view, partly in section, of the bag filter device of FIG. 1.

The bag filter device of FIGS. 1 and 2 has a plurality of filter bags 11, openings 20 in the partition 4, and bag clamping means as shown in FIGS. 3–8. For inspection and/or replacement of filter bags, the plenum chamber enclosure 6 and transition piece 13 are lifted off of the filter chamber or otherwise opened to provide suitable access to the bag clamping means. Following removal of nuts 28, if used, a bag and its frame can be removed through opening 20 by merely lifting by hand as shown in FIG. 7. The old bag can then be removed from frame 29 and a new one placed on the frame for simple reinsertion into the bag opening in the partition. Once the bag cuff has been gripped between the shoulder and the ring, nuts 28, if used, are retightened. Where desired, as will be apparent from a study of FIGS. 5 and 7, the bag 11 and frame 29 may be withdrawn downwardly through the partition opening 20 by disengagement of the hook 31 from the hanger bar 30 and lowering of the frame 29 and bag 11 into the filter chamber 2. In most installations gravity alone is sufficient to maintain a satisfactory seal and cause the structure to stay in place. It should be noted from FIGS. 9 and 10, for instance, that the bag cuff 21 folds over the shoulder and then under the clamping ring whereby gripping of the bag cuff occurs not only between the gripping faces of these two members but also between the bottom of the clamping ring and the plenum chamber side 18 of the partition 4, thus providing a double grip and seal effect.

The present invention provides certain advantages not made available from prior bag clamping apparatus as disclosed for instance in U.S. Pat. Nos. 3,505,359 to Fisher et al and 2,072,906 to Rosenberger. By means of the present apparatus there is no need for a steel ring to be sewn into the cuff of the bag, as disclosed by Fisher et al, for attempting to secure the bag and establish a seal at the partition between the plenum chamber and the filter chamber. Neither is there any need for a separate clip, as disclosed by Rosenberger, to hold a bag cuff in sealing engagement with a sleeve on a bag frame and the shoulder of a force-applying plate, for it will be appreciated that the present clamping mean is not dependent upon the presence of a bag frame.

A bag clamping means and a bag filter device which fulfill the aforestated objects has now been disclosed in detail, and even though the invention has been described with reference to particular apparatus, apparatus combinations, materials of construction, configuration, orientations, and the like, it will nonetheless be understood that even other embodiments will become apparent which fall within the spirit and scope of the invention defined in the following claims.

What is claimed and desired to secure by Letters Patent is:

1. In a bag filter device having a housing with a partition therein forming a filter chamber and a separate plenum chamber, said partition having a plurality of openings with an elongated filter bag mounted at each opening, each of said filter bags extending through one of said partition openings into said filter chamber, said filter chamber receiving air for filtration from an inlet and communicating said air through said filter bags and partition openings to said plenum chamber for discharge through an outlet, said filter bags entrapping solids suspended in said air, each filter bag having a closed end and an open end with a cuff at said open end, the improvement in bag mounting structure comprising:
   (a) a stationary shoulder on the plenum chamber side of said partition in surrounding relation to each of the openings therein;
   (b) each shoulder having associated therewith a clamping ring engaging one of said filter bag cuffs and sealing same against said shoulder;
   (c) each clamping ring having a hanger member secured thereto and extending thereacross, said hanger member being adapted as a handle;
   (d) an elongated bag supporting frame within each of said filter bags and having a transverse dimension less than the transverse dimension of said partition openings;
   (e) a disengageable connector projecting upwardly from each of said supporting frames and engaging a respective hanger member thereby suspending said frame and a filter bag thereon from said hanger member and permitting said frame and bag to be selectively withdrawn downwardly by disengagement from said hanger member or withdrawn upwardly through the associated partition opening;
   (f) each hanger member having extensions thereof projecting outwardly past the perimeter of the associated clamping ring, each extension having a seating device thereon; and
   (g) seating members on the plenum chamber side of said partition, each seating member being located for co-operation with a respective hanger member extension seating device and positively aligning a clamping ring for seating with a respective shoulder and clamping a filter bag cuff therebetween.

2. In a bag filter device as set forth in claim 1 wherein:
   (a) each seating device is a lug with a stud receiving opening formed therein on the respective hanger member extension; and
   (b) each seating member is a stud upstanding from said partition.

3. In a bag filter device as set forth in claim 1 wherein said disengageable connector is a hook.

4. In a bag filter device as set forth in claim 1 wherein:
   (a) each shoulder includes an outer surface facing away from the associated partition opening;
   (b) each clamping ring has an inner, inwardly facing surface; and
   (c) each filter bag cuff is sealingly clamped between a shoulder outer surface and a respective clamping ring inner surface.

5. In a bag filter device as set forth in claim 4 wherein each clamping ring is split into clamping ring halves, both halves being attached to a respective hanger member for inward and outward flexure of said clamping ring halves.

* * * * *